United States Patent
Bourny et al.

(10) Patent No.: US 9,917,664 B2
(45) Date of Patent: Mar. 13, 2018

(54) MONITORING THE QUALITY OF A COMMUNICATION CHANNEL SUPPORTED BY A SLIDING CONTACT

(71) Applicants: UNIVERSITE DE PICARDIE JULES VERNE, Amiens (FR); MERSEN FRANCE AMIENS SAS, Amiens (FR)

(72) Inventors: Valery Bourny, Amiens (FR); Jerome Fortin, Saint-Quentin (FR); Thierry Capitaine, Essigny-le-Grand (FR); Aurelien Lorthois, Beaurevoir (FR); Veronique Da Ros, Boulay (FR)

(73) Assignees: UNIVERSITÉ DE PICARDIE JULES VERNE, Amiens (FR); MERSEN FRANCE AMIENS SAS, Amiens (FR)

( * ) Notice: Subject to any disclaimer, the term of this patent is extended or adjusted under 35 U.S.C. 154(b) by 135 days.

(21) Appl. No.: 14/900,200

(22) PCT Filed: Jun. 23, 2014

(86) PCT No.: PCT/FR2014/051554
§ 371 (c)(1),
(2) Date: Dec. 21, 2015

(87) PCT Pub. No.: WO2014/207357
PCT Pub. Date: Dec. 31, 2014

(65) Prior Publication Data
US 2016/0142162 A1     May 19, 2016

(30) Foreign Application Priority Data
Jun. 27, 2013 (FR) .................................... 13 56216

(51) Int. Cl.
*H04B 3/46* (2015.01)
*H04B 17/309* (2015.01)
*H04B 3/60* (2006.01)

(52) U.S. Cl.
CPC ............. *H04B 17/309* (2015.01); *H04B 3/46* (2013.01); *H04B 3/60* (2013.01)

(58) Field of Classification Search
CPC ..... Y02E 10/721; Y02E 10/74; Y02E 10/726; Y02E 40/40; F03D 7/047; F03D 1/0675;
(Continued)

(56) References Cited

U.S. PATENT DOCUMENTS

| 6,034,531 | A | 3/2000 | Senglat et al. |
| 2011/0309943 | A1 | 12/2011 | Lohr |
| 2013/0218514 | A1* | 8/2013 | Schieke ................ H01R 39/58 702/138 |

FOREIGN PATENT DOCUMENTS

| FR | 2 751 416 A1 | 1/1998 |
| WO | 02/091003 A1 | 11/2002 |

OTHER PUBLICATIONS

International Search Report for PCT/FR2014/051554 dated Sep. 26, 2014.
French Search Report for FR 13 56216 dated Mar. 14, 2014.

* cited by examiner

*Primary Examiner* — Rahel Guarino
(74) *Attorney, Agent, or Firm* — Sughrue Mion, PLLC

(57) ABSTRACT

A method for monitoring the quality of a communication channel supported by a sliding contact is provided. The method includes controlling application of a continuous electrical signal onto one of elements of the sliding contact, receiving measured values of electrical signals measured on other of the elements of the sliding contact, estimating from the measured values, a variance parameter value, comparing the variance parameter value with a threshold and, on the basis of a result of the comparison, generating a signal representative of a quality of the communication channel.

13 Claims, 4 Drawing Sheets

(58) Field of Classification Search
CPC . F03D 7/024; F03D 80/85; F03D 1/06; H02P 2101/15; H02P 21/22; H02K 7/1838; H02K 7/183; H02K 13/003; H02K 16/00; B60L 2220/16; H04B 17/309; H04B 3/46; H04B 3/60
USPC ......... 375/224; 290/44, 55; 700/287; 702/58
See application file for complete search history.

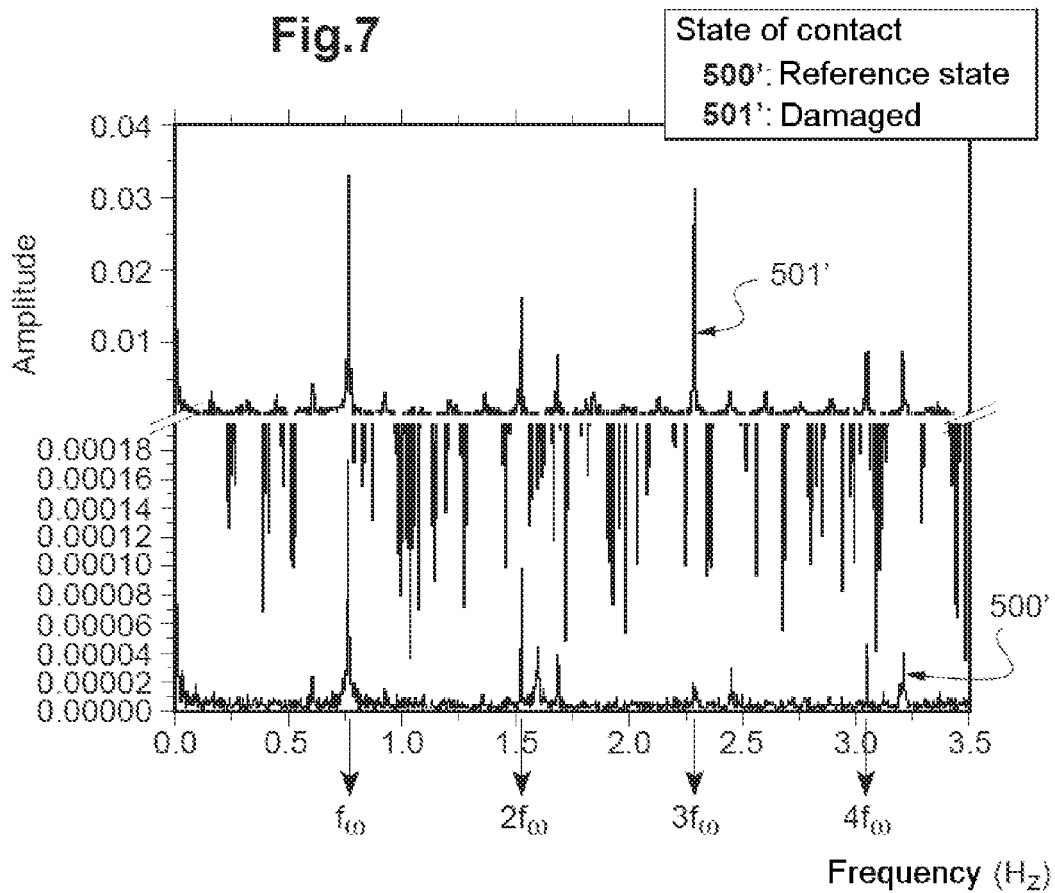

MONITORING THE QUALITY OF A COMMUNICATION CHANNEL SUPPORTED BY A SLIDING CONTACT

CROSS REFERENCE TO RELATED APPLICATIONS

This application is a National Stage of International Application No. PCT/FR2014/051554 filed Jun. 23, 2014, claiming priority based on French Patent Application No. 13 56216 filed Jun. 27, 2013, the contents of all of which are incorporated herein by reference in their entirety.

BACKGROUND

The invention relates to the monitoring of the quality of a communication channel supported by a sliding contact. It is known practice to transmit electrical signals between two mutually mobile elements. Such data transmission devices on a sliding contact are implemented in various fields.

A transmission device can for example comprise one or more slip rings and one or more respective contact elements, that will hereinafter be designated "wiper": for example brushes, wires, fibers or similar, arranged so as to rub against the slip ring(s).

A communication channel involves a number of layers, including a physical layer, responsible for the actual transmission of signals, here electrical, here on a sliding contact, and other higher level layers. These higher level layers, called protocol layers in the present application, have various corresponding protocol parameters, notably parameters concerning a bit rate, a modulation, an error correcting code, a frame structure, communication rules (for example providing for the transmission of a frame to acknowledge reception and a repeat sending if a receipt acknowledgment frame is not received after a given time period), etc.

The invention thus has numerous applications, for example in medical imaging, crane systems, fairground rides, helicopters or wind turbines.

In particular, the invention will be applicable to signal transmission systems, or signal transfer systems (STS). These STS systems are electrical and mechanical systems whose function is to transmit, in an industrial machine, via a sliding contact, power electrical current and electrical signals, the latter transmission being performed according to a communication protocol.

Thus, in the case of a wind turbine, a slip ring device makes it possible to transfer data, notably between sensors installed on a mobile part of the nacelle, for example the nose of the nacelle of the wind turbine, and a processor in the nacelle or on the ground. For example, measurement data from sensors, for example values of blade orientation, of blade vibration, or similar, can be transmitted via this STS system, to the processor, and, conversely, control data from the processor, for example messages to impose a rotation of the blades, or similar, can also be transferred via the STS system.

Unfortunately, the quality of a communication channel implementing a sliding contact is likely to become degraded. This degradation is in all likelihood linked to a number of parameters, notably the temperature, the humidity, the presence of dust, the vibrations undergone, any overvoltages, etc.

It is known practice to regularly check, and if necessary improve, the state of the lubrications of the sliding contact in order to improve the quality of the transmissions. Nevertheless, such maintenance operations involving dismantling can be relatively complex and lengthy to perform, particularly when they involve an intervention at a location that is relatively difficult to access, like a wind turbine nacelle might be.

It is also known practice to detect the wear of a sliding contact from electrical measurements. The document FR 96 08944 thus describes a measurement of voltage and current on either side of a sliding contact. A resistance value is deduced therefrom and is compared to a threshold. If this resistance value is greater than the expected threshold, it is considered that the sliding contact is worn, and the contact is replaced.

The document US 2011/0309943 describes a method involving a monitoring of the useful signals received on one of the mobile elements and a statistical analysis of these signals.

It is however still relatively difficult to estimate whether a data communication protocol can be supported by a sliding contact in its current state.

There is therefore a need for a finer estimation of the quality of a communication channel implementing a signal transmission device between two mutually mobile elements.

SUMMARY

A method is proposed for monitoring the quality of a communication channel supported by a device for transmitting electrical signals between two mutually mobile elements forming a sliding contact, the method comprising:
  controlling the application of a DC electrical signal to one of the elements of the transmission device,
  receiving a plurality of electrical signal values measured on the other of the elements of the transmission device,
  estimating, from said plurality of measured values, a variance parameter value,
  comparing the variance parameter value to a threshold,
  as a function of the result of the comparison, generating a signal representative of the quality of the communication channel.

Surprisingly, it has actually been proven that, from measurement values obtained following the injection of a DC electrical signal on one of the elements of a sliding contact, it is possible to estimate a value of a variance parameter which is in itself relevant enough to make it possible to take a decision as to whether such or such a communication protocol will be able to be supported or not by this sliding contact.

Since the signal applied is DC, that is to say of constant amplitude in time, at least for a given time period, for example 100 ms, one second or longer, the method can be relatively simple to apply. The time period during which the DC signal is applied can have a duration that is a function of the application. In the case of a rotary sliding contact, the time period can be greater than or equal to a period of rotation of the sliding contact, advantageously greater than or equal to 5 or 10 periods, for example of the order of a hundred or so periods.

The invention is in no way limited by the precise nature of the variance parameter. It will for example be able to be variance itself, standard deviation, variance divided by the measured voltage average, or other.

Advantageously, and in a nonlimiting manner, the threshold can be chosen as a function of at least one protocol parameter of the communication channel, for example as a function of the expected bit rate, of a robustness parameter, of an identifier of the communication rules, and/or another parameter.

It will for example be possible to provide a preliminary threshold determination phase, during which an analyzer transmits data frames, in accordance with a given protocol. A DC electrical signal is applied to one of the elements of the transmission device. A plurality of electrical signal values is measured on the other of these elements, and a variance parameter value is estimated. Thus, by also collecting the data transmitted and received via this transmission device, it becomes possible to associate a number of frames lost with each estimated variance parameter value, and therefore establish a mapping between the variance parameter and the loss of frames.

Frame loss is linked to the protocol in as much as it depends on numerous parameters of that protocol, notably the data rate, the carrier frequency or frequencies, the robustness of the error correcting codes, the communication rules, etc. A frame will indeed be considered to be lost if it is not received in full or if the data of the frame received is too eroded for the useful information to be able to be recovered.

This preliminary phase can be performed for each electrical signal transmission device model, or even for each electrical signal transmission device.

This calibration phase can make it possible to establish a mapping between the transfer of the protocol frames and the voltage noise. It is thus possible for the threshold to be chosen to correspond for example to a given frame loss percentage, for example 5 or 10%.

It will be possible to provide, during this preliminary phase, for the use of the electrical signal transmission device, by applying, between the mobile elements, a speed close to the speed or speeds expected in normal operation. For example, in the case of a slip ring, it will be possible to provide a rotation speed of 20 revolutions per minute.

In one embodiment, the threshold can be chosen as a function also of the relative speed of the mutually mobile elements. For example, in the calibration phase, it will be possible to determine a plurality of thresholds, each threshold of this plurality corresponding to a speed or to a given range of speeds. It has indeed been observed that the variance increased with the rotation speed.

Advantageously, and in a nonlimiting manner, the method can further comprise:
estimating, from the plurality of measured values, and advantageously from the variance parameter value, at least one entropy parameter value, and,
estimating a surface state parameter value of the contact as a function of this at least one entropy parameter value.

By thus estimating the quantity of information that can be obtained after the application of a DC electrical signal, it is indeed possible to evaluate the surface state of the contact between the mobile elements. Indeed, if the uncertainty as to the values measured on one of the elements after the injection of a DC electrical signal on the other of these elements is relatively high, it can be presumed that the surface state is relatively uneven.

The invention is in no way limited by the precise nature of the entropy parameter. It will for example be possible to use Shannon's formula, Rényi's formula, or another formula, and the entropy parameter can equally be an entropy value or a value obtained from the entropy value, for example a square root of this entropy value, or similar.

This estimation of the surface state can be performed independently of the estimation of the quality of the channel. A method is thus proposed for monitoring the quality of a surface state of a device for transmitting electrical signals between two mutually mobile elements forming a sliding contact, the method comprising:
controlling the application of a DC electrical signal to one of the elements of the transmission device,
receiving a plurality of electrical signal values measured on the other of the elements of the transmission device,
estimating, from said plurality of measured values, an entropy parameter value,
estimating a surface state parameter value of the contact as a function of this entropy parameter value.

Advantageously, and in a nonlimiting manner, each electrical signal value on the other of the elements of the transmission device has an associated reception instant value.

Advantageously, and in a nonlimiting manner, the method can further comprise a step of analysis of the plurality of electrical signal values received in the frequency domain. The method can thus comprise a step of decomposition in the frequency domain of the received values.

Advantageously, and in a nonlimiting manner, the method can comprise a step consisting in determining at least one harmonic amplitude parameter value corresponding to at least one respective harmonic frequency. The amplitude parameter value can be normalized. It is possible to estimate a state of the transmission device as a function of this harmonic amplitude parameter value.

The method can for example comprise a step of comparison of this amplitude value to a predetermined amplitude threshold. It has in fact been found that, when a sliding contact is relatively worn, the harmonic amplitude values can be relatively higher than when the contact is new and lubricated. It is thus proposed to detect the state of the contact based on this harmonic amplitude parameter.

This amplitude threshold can for example have been determined in a preliminary phase, on each transmission device or else just once for this transmission device model.

Advantageously, it will be possible to provide for determining a plurality of harmonic amplitude values, in particular an amplitude value for the harmonic of first rank, that is to say for the fundamental frequency, and one or more harmonic values for the harmonics of ranks higher than 1, then of comparing these values with one another in order to detect any transmission device faults.

In effect, the transmission device is made to vibrate by its rotation. This vibration corresponds to the fundamental frequency. Depending on how the sliding contact has been designed, manufactured, installed, etc, the transmission device can exhibit out-of-balance, out-of-round, or similar faults. If there is a fault, additional vibrations may be undergone by the sliding contact. These additional vibrations can have an influence on this at least one harmonic amplitude value.

When the transmission device exhibits mechanical faults leading to undesired vibrations, the absolute and relative amplitudes of the harmonics of the main rotation frequency can increase relatively significantly.

This analysis based on the absolute or relative values of the harmonic amplitudes can in particular be performed during the installation of the transmission device, or else during a maintenance operation, in order to check that the device is correctly installed.

Advantageously, and in a nonlimiting manner, it will be possible to provide for estimating a value of a power spectral density parameter, for example by taking the square of the modulus of the frequency transform divided by the integration time, or similar.

The method can comprise a step consisting in comparing this power spectral density parameter value to a power spectral density threshold. It has in fact been found that the average power spectral density of the voltage noise can increase considerably when the contact is degraded.

The invention is in no way limited by the type of decomposition implemented in the frequency analysis. It will for example be possible to perform a fast Fourier transform, or similar.

This frequency analysis can be performed independently of the estimation of the quality of the channel from the variance parameter. A method is thus proposed for estimating a state of a device for transmitting electrical signals between two mutually mobile elements forming a sliding contact, the method comprising:

controlling the application of a DC electrical signal to one of the elements of the transmission device, receiving a plurality of electrical signal values measured on the other of the elements of the transmission device, each value of said plurality being associated with a reception instant value, analyzing the plurality of electrical signal values received in the frequency domain, estimating a state of the transmission device as a function of the results of this analysis.

The invention is in no way limited by the type of transmission device implemented. It will for example be possible to provide a revolving joint, a slip ring or similar. The contact can be of spot, per unit length or per surface area type. In the case of a slip ring, it is possible for example to incorporate a wire ring system, or a brush ring system, or similar.

The invention has many possible applications. It will for example be possible to cite fairground rides, cranes, waste water processing systems, packaging, printing industrial machines, medical scanners, helicopters, wind turbines, and so on.

Nor is the invention limited by the communication protocol tested. It will for example be possible to cite RS232, RS 422, RS485, RS422, CAN (controller area network) bus, Ethernet, Profibus (process field bus), Modbus, Interbus.

Any given protocol has an associated defined number of channels, for example three channels for the RS232 protocol, two or four channels for the RS485 protocol, two channels for BusScan and five channels for Ethernet. Consequently, the signal transmission device can comprise a plurality of sliding contacts, for example a plurality of rings.

The method described above can be implemented by digital processing means, for example a processor.

A computer program product is also proposed, comprising the instructions for performing the steps of the method described above when these instructions are executed by a processor. This program stored on a memory medium, for example a hard disk or similar, downloaded from a telecommunication network of internet type, or similar.

A device is also proposed for monitoring the quality of a communication channel supported by a device for transmitting electrical signals between two mutually mobile elements forming a sliding contact, the device comprising:

transmission means for controlling the application of a DC electrical signal to one of the elements of the transmission device, reception means for receiving a plurality of electrical signal values measured on the other of the elements of the transmission device, processing means arranged to estimate, from said plurality of measured values, a variance parameter value, to compare the variance parameter value to a threshold, and to generate, as a function of the result of the comparison, a signal representative of the quality of the communication channel.

This device can for example be incorporated in or comprise one or more processors, for example a microcontroller, a microprocessor, a DSP (digital signal processor), or similar.

The transmission means can for example comprise an output pin, an output port, or similar. The reception means can for example comprise an input pin, an input port, or similar. The processing means can for example comprise a processor core or CPU (central processing unit).

There is also proposed a system for monitoring the quality of a communication channel supported by a device for transmitting electrical signals between two mutually mobile elements forming a sliding contact. This system comprises:

a monitoring device as described above, means for applying the DC electrical signal, for example an electrical wire linked on one side to the monitoring device, and on the other side to this transmission device element, measurement means suitable for measuring electrical signal values on the other of the elements of the transmission device, for example a voltmeter and/or an ammeter, electrically connected to this other of the elements of the transmission device.

The invention also targets the use of a monitoring device described above for monitoring the quality of a communication channel supported by a revolving joint, or more generally, a rotating electrical machine. It is thus possible to perform a diagnosis without opening the casing of the rotating electrical machine.

The rotating electrical machine can be an STS of a wind turbine.

The electrical signal transmission device can thus comprise an STS, and notably a slip ring device, for example a system of wire ring, brush ring or similar.

BRIEF DESCRIPTION OF THE DRAWINGS

The invention will be better understood with reference to the figures which illustrate embodiments given by way of example and in a nonlimiting manner.

FIG. 7 is a graph with, on the x axis, frequency values, and, on the y axis, amplitude values obtained by applying a decomposition to the measured voltage values of FIG. 6.

Identical references may designate elements that are identical or similar, in their form or their function, from one figure to another.

DETAILED DESCRIPTION

Figure 1:
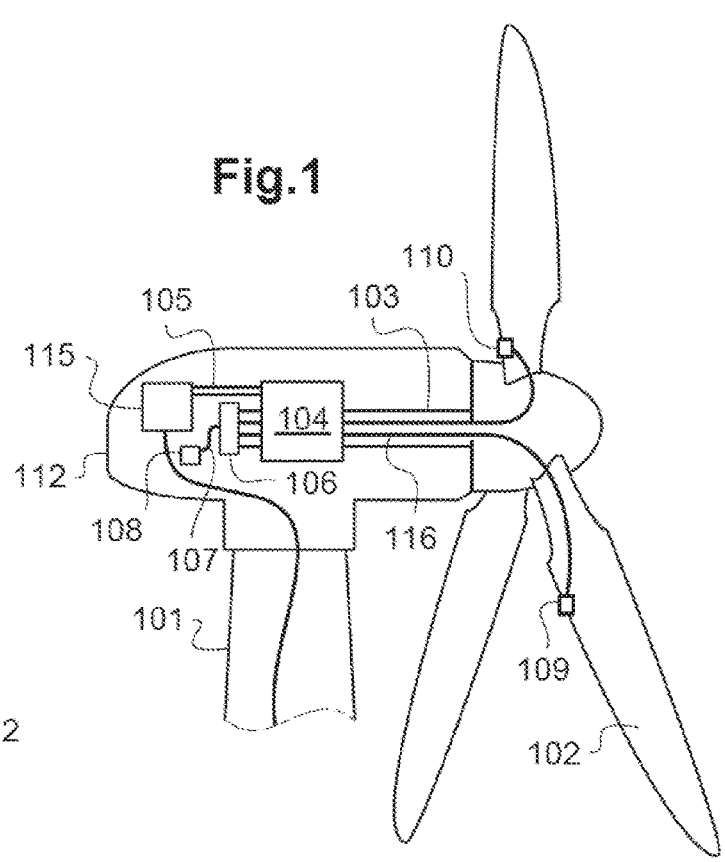
FIG. 1 schematically shows an exemplary wind turbine incorporating an STS.

Referring to FIG. 1, a wind turbine 100 comprises a mast 101, a nacelle 112 and blades 102 secured to a so-called slow shaft 103.

A multiplying gear 104 is used to convert the rotational movement of the slow shaft 103 into a faster movement of a so-called fast shaft 105.

A generator 115 makes it possible to generate current from the movement of this fast shaft 105.

The wind turbine is equipped with sensors, for example vibration or similar sensors, just one of which 109 is represented here in the interests of clarity. A processor 108 receives signals from these sensors and accordingly controls actuators, for example a motor 110, to modify the orientation of the blades 102. The sensors 109 and the actuators 110 are thus secured to the blades, while the processor remains fixed.

Cables 116 connected to the sensors or to the actuators are installed inside the slow shaft 103.

An STS 106 is situated in proximity to the multiplying gear 104 and mechanically coupled to the slow shaft 103. The STS 106 comprises a casing, inside which are installed a set of slip ring systems (not represented in FIG. 1). The rings are secured to the blades and the slow shaft 103, and each ring is connected to a respective cable 116 installed inside the slow shaft 103 and also linked to a sensor, an actuator, or another device secured to the blades.

A fixed wiper, for example a wire, rubs against each ring.

Figure 2:
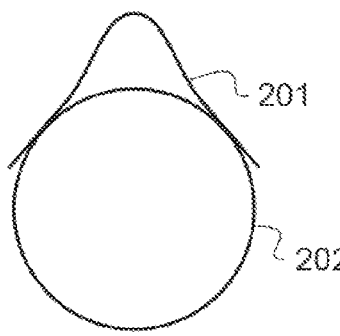
FIG. 2 shows an exemplary electrical signal transmission device incorporated in an STS.

FIG. 2 shows an exemplary wire ring system. A wire 201 rubs against the ring 202 when this ring is driven in movement by the slow shaft.

This wire 201 is also connected to an output cable referenced 107 in FIG. 1. In FIG. 1, just one cable 107 is represented, but it will be understood that the STS can incorporate a relatively high number of slip rings and therefore of cables 107, for example 3, 4, 7, or even more channels dedicated to the signal transfer, depending on the protocol(s) supported. These cables 107 make it possible to connect the STS 106 to a processor 108. The processor 108 is arranged to drive the motor 110 from information obtained from the sensors 109.

Additional cables, not represented, make it possible to transfer power between the STS 106 and the blade orientation motor 110.

The surface state of the sliding contacts, of the type of that represented in FIG. 2, is likely to become corrupted over time, such that it is wise to monitor the quality of the communication channel that is thus supported by this sliding contact.

Figure 3:
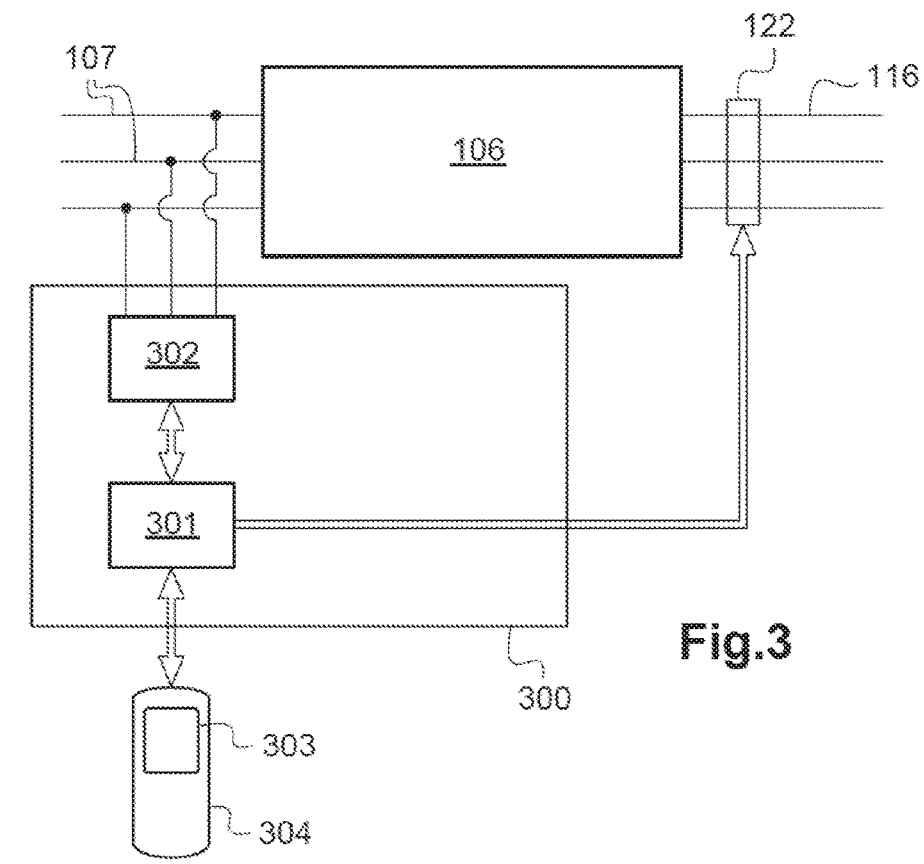
FIG. 3 schematically illustrates an operation for monitoring the quality of a communication channel, using a monitoring system according to an embodiment of the invention.

Referring to FIG. 3, a monitoring system 300 incorporates a monitoring device of the type 301, here a processor and a voltmeter device 302. This system 300 is in wired or wireless communication with a user terminal 304 incorporating display means 303, for example a screen.

The processor 301 is also connected to each of the rings of the STS 106, via mercury collectors schematically represented and referenced 122, or via another adapter device, for example a revolving joint or, more generally, a rotating electrical machine.

In an alternative embodiment that is not represented, provision can be made to place two STS to be tested in series, and to connect the monitoring device on one side to the input of one of these STS and on the other side to the output of the other of these STS; this can make it possible to avoid providing an adapter device of the mercury collector type.

To return to FIG. 3, the voltmeter device 302 makes it possible to obtain voltage values measured for each of the cables 107 of the STS 106. Alternatively, it would be possible to link the voltmeter directly to the wipers of the type of that referenced 201 in FIG. 2.

In this example, a DC current is applied and a voltage is measured, but the invention is in no way limited by the nature of the electrical signals applied and measured. It would for example be possible to apply and measure a current.

The processor 301 is arranged to control the application of a DC electrical signal to each of the rings of the STS 106. The voltmeter 302 makes it possible to record voltage values measured on the wiper sliding against this ring, and these values V(n) measured over time are transmitted to the processor 301. The processor 301 analyzes these values, and, depending on the result of the analysis, generates a message transmitted to the terminal 303 in order for a monitoring report concerning the STS 106 to be displayed.

It will be noted that this monitoring system 300 can be implemented without needing to dismantle the STS 106, such that this monitoring operation can be easier to conduct than a maintenance operation on each of the sliding contacts.

Figure 4:
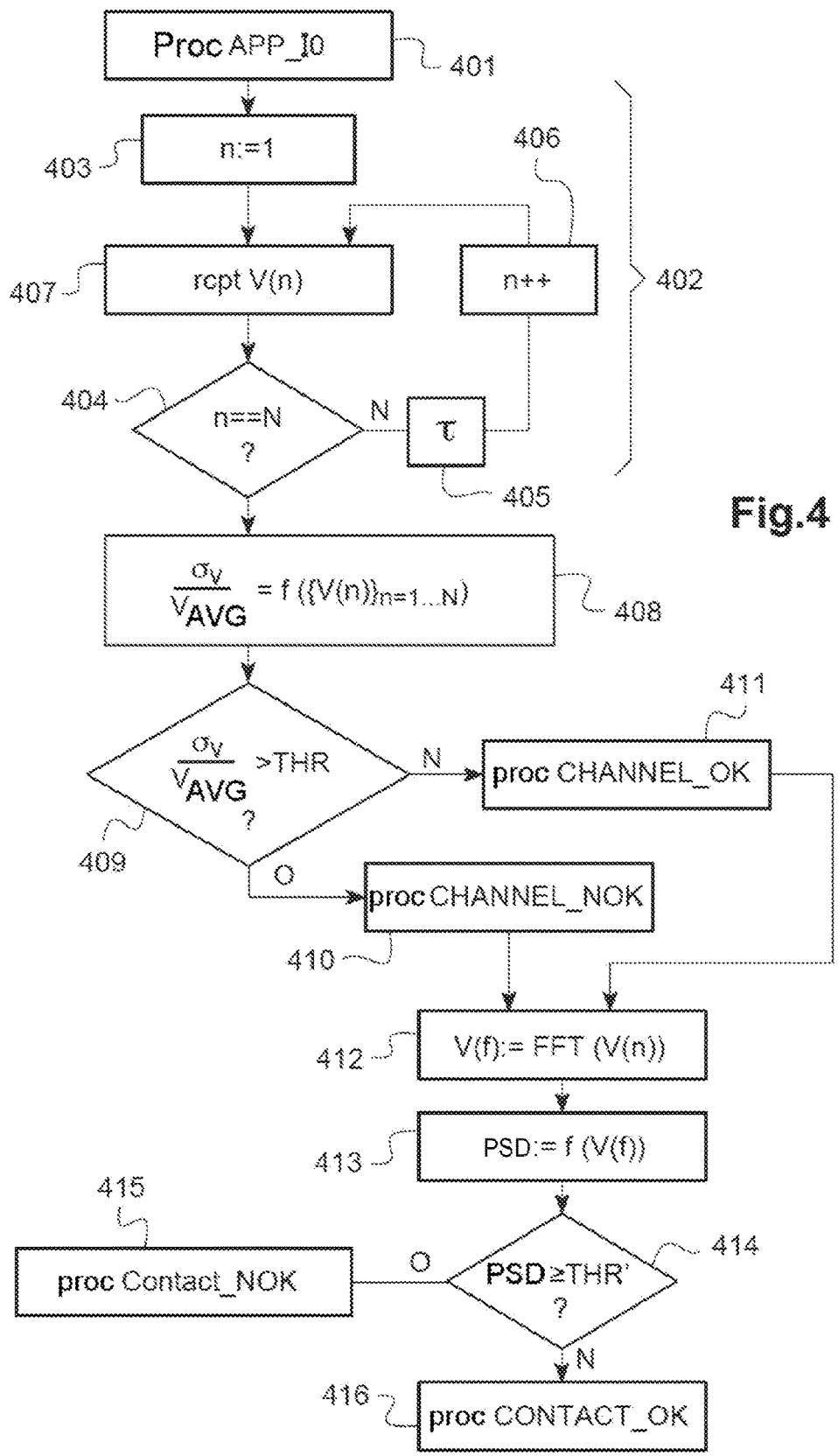
FIG. 4 is a flow diagram of an exemplary method according to an embodiment of the invention.

FIG. 4 illustrates an exemplary method implemented by the processor 301.

This processor first transmits a message APP_I0 in order to apply a DC current, of amplitude equal to 50 mA for example, to a given ring of the STS during a step 401.

Then, a loop 402 is put in place in order to collect a set of voltage values measured by the voltmeter. This sampled loop n comprises steps of initialization 403, of output test 404, of waiting 405 and of incrementation 406. On each loop, a voltage value V(n) is received during a step 407.

When a number N of voltage values have thus been received, a value of a variance parameter $$\frac{\sigma_V}{V_{avg}}$$

is estimated during a step 408. More specifically, the variance $\sigma_V$ of the voltage is determined from N measured values and this variance value $\sigma_V$ is divided by an average voltage value $V_{avg}$.

Then, during a step 409, this variance parameter value $$\frac{\sigma_V}{V_{moy}}$$

is compared to a threshold THR.

This threshold THR was determined in a preliminary analysis phase. During this preliminary analysis phase, a protocol analyzer makes it possible to establish a mapping between the transfer of frames according to a given protocol and this variance parameter. The analyzer transmits frames in accordance with the given protocol, and makes it possible to determine a number of frames lost on the passage of the sliding contact.

Figure 5:
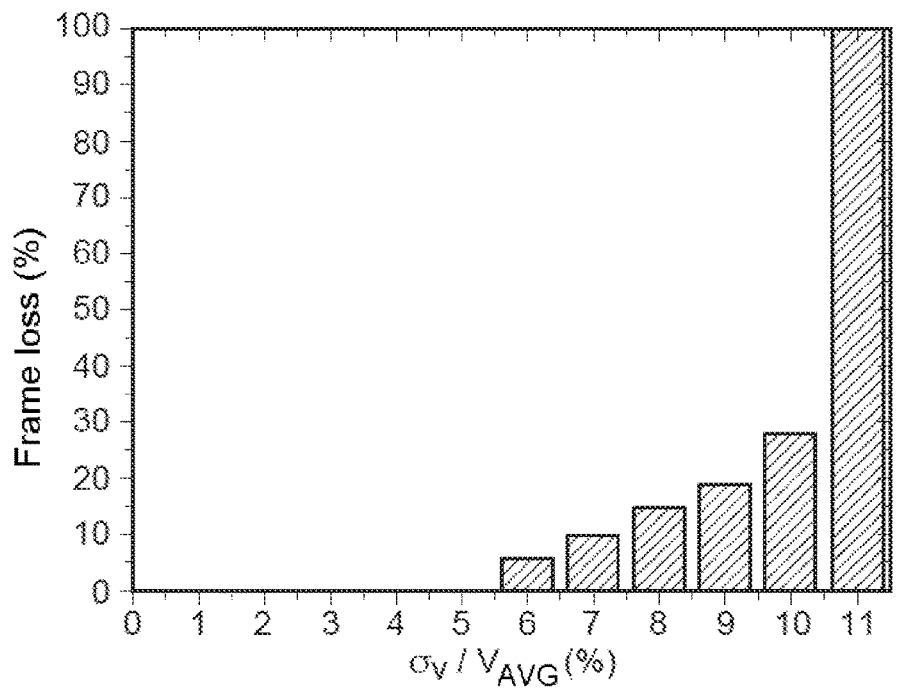
FIG. 5 is a graph obtained in a preliminary phase, with, on the x axis, a variance parameter value, and, on the y axis, a frame loss rate measured in this preliminary threshold determination phase, upon the application of a set of methods according to an embodiment of the invention.

In this preliminary analysis phase, various sliding contacts are tested, each exhibiting a different variance parameter value For example, as represented in FIG. 5, a first sliding contact is tested that has a variance parameter value $$\frac{\sigma_V}{V_{avg}}$$

equal to 1%, a second sliding contact is tested that has a variance parameter value $$\frac{\sigma_V}{V_{avg}}$$

equal to 2%, and so on, up to an eleventh sliding contact for which the variance parameter value $$\frac{\sigma_V}{V_{avg}}$$

is equal to 11%.

In this preliminary test phase, the rotation speed is chosen to be equal to a speed characteristic of the operation of the system for each of the sliding contacts, for example 20 revolutions per minute.

FIG. 5 shows that the frame loss rate is clearly linked to the variance parameter value. Thus, the protocol tested, here an Ethernet protocol with a bit rate chosen from a range between 10 Mb/s and 100 Mb/s, is perfectly robust when this variance parameter value $$\frac{\sigma_V}{V_{avg}}$$

is less than or equal to 5%. On the other hand, for variance parameter values $$\frac{\sigma_V}{V_{avg}}$$

between 6 and 10%, the frame loss rate varies between approximately 5 and 30%. Finally, for a variance parameter value of 11% or more, it can be presumed that all the frames will be lost.

It is thus possible to choose, for the Ethernet protocol with this bit rate value, a threshold value THR of the variance parameter $$\frac{\sigma_V}{V_{avg}},$$

for example equal to 5%, because this preliminary analysis phase has made it possible to demonstrate that, for a rotation speed of 20 revolutions per minute, the frame loss rate was acceptable when this variance parameter value $$\frac{\sigma_V}{V_{avg}}$$

was less than or equal to 5%.

For another protocol, the threshold will possibly have a different value. For example, in the case of a CAN bus with a bit rate of 1 Mb/s, there is no frame loss as long as the variance parameter value $$\frac{\sigma_V}{V_{avg}}$$

is less than or equal to 10%: it will therefore be possible to choose a threshold of 10%.

In these examples, the test phase was performed with a rotation speed of 20 revolutions per minute. It will of course be possible to provide another test phase, with other rotation speeds, in order to best characterize the quality of the communication channel.

To return to FIG. 4, if the test 409 shows that the value of the variance parameter determined in the step 408 is greater than 5%, then the processor generates a CHANNEL_NOK message to indicate to the operator that the communication channel probably has insufficient quality. This transmission is performed during a step 410.

If, on the other hand, the test 409 is negative, then the processor generates a CHANNEL_OK message during a step 411 to indicate to the operator that the communication channel has satisfactory quality.

The method illustrated by FIG. 4 further comprises steps for following another indicator, for this time characterizing the state of the sliding contact. In this example, a step 412 of decomposition in the frequency domain of the measured voltage values is thus provided, for example by applying a fast Fourier transform, then, during a step 413, a power spectral density PSD value is determined.

This power spectral density is compared to a power spectral density threshold THR' during a step 414. If it is found that the power spectral density value, typically representative of the voltage noise, is greater than this threshold THR', then the processor generates a message indicating that the quality of the sliding contact is unsatisfactory, and transmits this message during a step 415 to a terminal of the operator.

If, on the other hand, the test 414 is negative, then it is a message indicating that the contact is in a sufficiently satisfactory state that is transmitted to the terminal of the operator, during a step 416.

The operator thus receives information concerning the communication channel and information concerning the surface state. If, for example, it is found that the surface state is satisfactory, but that the transmission channel has an insufficient quality, the operator can decide to apply to the other protocol, for example having a lower bit rate or a more robust error correcting code, for the transfer of the data between the devices mounted on the blades 109, 110 and the processor 108.

Figure 6:
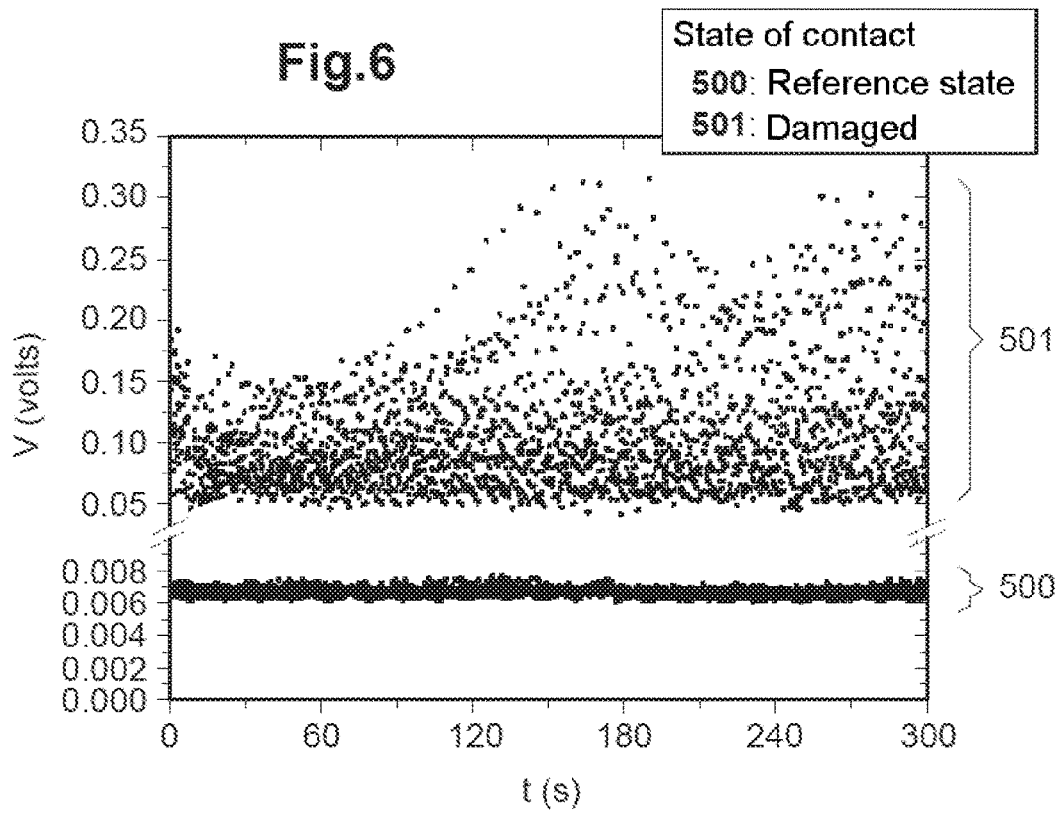
FIG. 6 is a graph for which each point represents a voltage value measured upon the application of an exemplary method according to an embodiment of the invention.

FIG. 6 is a graph with, on the x axis, the time, in seconds, and, on the y axis, voltage values, in volts, each point of this graph corresponding to a measurement point. The set of points 500 was obtained for a slip ring type system with a new contact. The cloud of points 501 was obtained for this same system in a degraded state. In this case, the rotation speed is 46 revolutions per minute, which corresponds to a frequency of approximately 0.77 Hz. The voltage was measured over a duration of 300 seconds.

As can be seen, the received voltage values vary much more when the sliding contact is in a degraded state, than when the sliding contact is new. Thus, in this example, the variance $\sigma_V$ obtained from the cloud of points 501 is 0.04992, whereas the variance $\sigma_V$ obtained from the set of points 500 is 0.00056.

The value of the parameter representative of the variance $$\frac{\sigma_V}{V_{avg}}$$

for the cloud of points 501 is 47.8%, whereas this value is 7.9% in the case of the contact in a new state.

It further emerges that the voltages are much higher when the contact is degraded than when the contact is new. The average voltage following the application of a DC current of 50 milliamperes is thus 0.00708 volts in the case of the new contact, whereas, in the case of the degraded contact, this average voltage is 0.10448 volts. It is therefore perfectly possible to provide for comparing these time-related indicators, that is to say the average value of the voltage, and/or the variance with respective thresholds in order to obtain more information concerning the quality of the transmission channel, even though these steps are not represented in the flow diagram of FIG. 4, this flow diagram remaining relatively undetailed for the purposes of clarity.

Referring to FIG. 7, frequency values, in hertz, are represented on the x axis, and amplitude values are represented on the y axis, these amplitude values having been obtained by frequency decomposition of the sets of points 500, 501.

The graph 500' was thus obtained by applying a fast Fourier transform to the voltages corresponding to the set of points 500, whereas the graph 501' was obtained by applying a fast Fourier transform to the voltages corresponding to the cloud of points 501.

As can be seen, the amplitude of the graph 501' is much higher than that of the graph 500'. Other frequency indicators such as the amplitude of the different harmonics can also make it possible to characterize the state of the contact.

The tables below give values that are thus obtained for different frequency indicators, here harmonic amplitude values and average power spectral density values, and an entropy indicator, as well as their ratio.

| System | Amplitude 1f | Amplitude 2f | Amplitude 3f | Amplitude 4f |
|---|---|---|---|---|
| New Contact | 0.000176 | 0.000100 | 0.000021 | 0.000048 |
| Degraded | 0.03306 | 0.01636 | 0.03138 | 0.00915 |
| Ratio of the Indicators | 188 | 163 | 1494 | 191 |

| System | PSD (V²/Hz) | Entropy rate (Hz) |
|---|---|---|
| New Contact | 3.51 · 10⁻⁹ | 39.8 |
| Degraded | 4.26 · 10⁻⁵ | 18.6 |
| Ratio of the Indicators | 16985 | 0.47 |

It can be seen that the frequency indicators increase substantially when the contact is degraded. Notably, the average power spectral density of the voltage noise is different by four orders of magnitude from one contact to another.

The first harmonic, called fundamental harmonic, corresponds to the rotation speed of the sliding contact. The spectra thus obtained are sensitive to the mechanical state of the sliding contact. The spectrum 500' comprises harmonics of the fundamental component of the rotation of the ring, the harmonics of order higher than 1 having lower amplitudes than the amplitude corresponding to the fundamental frequency. These harmonics are due to the vibrations of the ring generated by the rotation. In the case of a fault of out-of-balance type, or similar, the spectrum is likely to be enriched, that is to say that the absolute and relative amplitudes of the main frequency of rotation are likely to increase significantly. It will thus be possible to provide tests consisting in comparing the different harmonic amplitude values with one another in order to better detect its faults.

It will also be possible to provide a display of the spectrum obtained, in order for a technician, during installation or a maintenance operation, to be able to correct the faults based on this representation of the spectrum.

With respect to the entropy indicator, the entropy parameter, here an entropy rate TE, is obtained from the variance $\sigma_V$ and from the power spectral density PSD by applying the following formula:

$$TE = \frac{1}{\pi} \cdot \frac{\sigma_V^2}{PSD}$$

This formula makes it possible to estimate a parameter value representative of the entropy relatively easily and rapidly.

The invention claimed is:

1. A method for monitoring a quality of a communication channel supported by a device for transmitting electrical signals between two mutually mobile elements forming a sliding contact, the method comprising:
   controlling, by a processor, application of a DC electrical signal to one of the elements of the two mutual mobile elements;
   receiving, by the processor, a plurality of electrical signal values measured on the other of the two mutual mobile elements;
   estimating, using the processor from said plurality of measured values, a variance parameter value $$\left(\frac{\sigma_V}{V_{moy}}\right);$$

comparing, by the processor, the variance parameter value to a threshold;
   as a function of a result of the comparison, generating a signal representative of the quality of the communication channel, and controlling, using the processor, at least one protocol parameter of the communication channel.

2. The method as claimed in claim 1, wherein the threshold is chosen as a function of the at least one protocol parameter of the communication channel.

3. The method as claimed in claim 1, further comprising:
estimating, from the plurality of measured values, an entropy parameter value, and,
estimating a surface state parameter value of the sliding contact as a function of the entropy parameter value.

4. The method as claimed in claim 1, wherein each received electrical signal value has an associated reception instant value, and
wherein the method further comprises performing decomposition in a frequency domain of the received electrical signal values.

5. The method as claimed in claim 4, further comprising
determining at least one harmonic amplitude parameter value corresponding to at least one respective harmonic frequency, and
estimating a state of the transmission device from the at least one harmonic amplitude parameter value.

6. The method as claimed in claim 5, wherein the at least one harmonic amplitude parameter value is compared to an amplitude threshold.

7. The method as claimed in claim 5, comprising
determining a plurality of harmonic amplitude parameter values, the harmonic amplitude parameters values including a harmonic amplitude parameter value for a harmonic of a first rank, and one or more harmonic amplitude parameter values for harmonics of higher ranks,
comparing the plurality of harmonic amplitude parameter values in order to detect transmission device faults.

8. The method as claimed in claim 1, further comprising
estimating a power spectral density parameter value; and
comparing the power spectral density parameter value to a power spectral density threshold.

9. The method as claimed in claim 1,
wherein the DC electrical signal is applied to a cable electrically coupled to the one of the elements of the two mutual mobile elements, and
wherein the plurality of electrical signal values are measured on a cable electrically coupled to the other of the two mutual mobile elements.

10. A device for monitoring a quality of a communication channel supported by a device for transmitting electrical signals between two mutually mobile elements forming a sliding contact, the device comprising:
transmission means for controlling application of a DC electrical signal to one of the elements of the two mutual mobile elements,
reception means for receiving a plurality of electrical signal values measured on the other of the two mutual mobile elements, and
processing means arranged to estimate, from said plurality of measured electrical signal values, a variance parameter value, to compare the variance parameter value to a threshold, and to generate, as a function of a result of the comparison, a signal representative of the quality of the communication channel, and controlling at least one protocol parameter of the communication channel.

11. The device as claimed in claim 10, wherein the device for transmitting electrical signals is a rotating electrical machine.

12. The device as claimed in claim 11, wherein the rotating electrical machine comprises a signal transmission system of a wind turbine.

13. The device as claimed in claim 10, wherein the transmission means applies the DC electrical signal to a cable electrically coupled to the one of the elements of the two mutual mobile elements, and
wherein the reception means receives the plurality of electrical signal values measured on a cable electrically coupled to the other of the two mutual mobile elements.

* * * * *